UNITED STATES PATENT OFFICE.

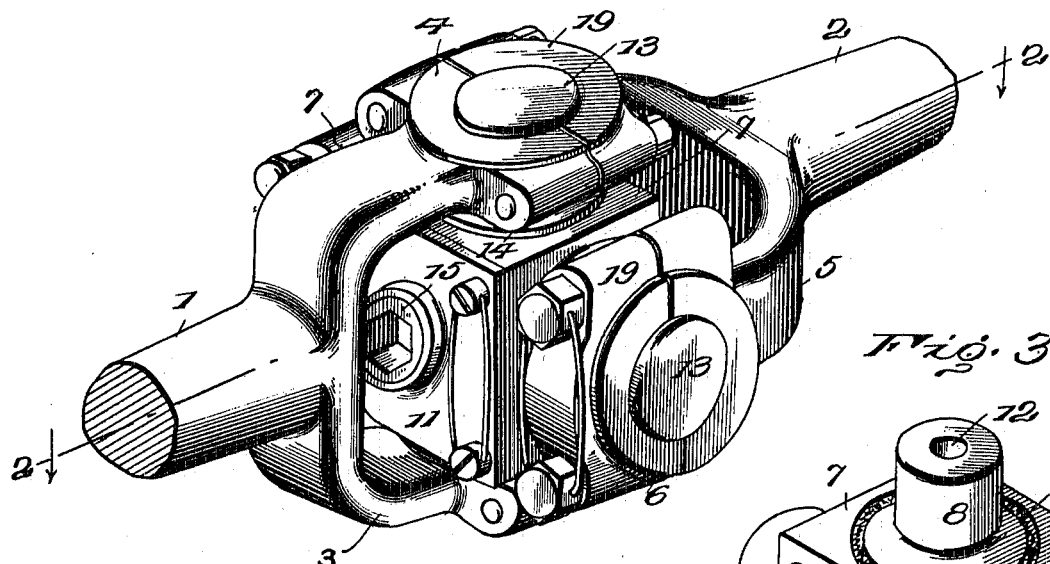

ALEXANDER WINTON AND HAROLD B. ANDERSON, OF CLEVELAND, OHIO, ASSIGNORS TO THE WINTON MOTOR CARRIAGE COMPANY, OF CLEVELAND, OHIO.

UNIVERSAL JOINT AND SYSTEM OF LUBRICATION THEREFOR.

1,106,325.  Specification of Letters Patent.  Patented Aug. 4, 1914.

Application filed March 9, 1912. Serial No. 682,808.

*To all whom it may concern:*

Be it known that we, ALEXANDER WINTON and HAROLD B. ANDERSON, citizens of the United States, residing at Cleveland, in the county of Cuyahoga and State of Ohio, have invented certain new and useful Improvements in Universal Joints and Systems of Lubrication Therefor, of which the following is a specification, reference being had therein to the accompanying drawing.

Our invention relates to improvements in universal joints and system of lubrication therefor, and which is particularly designed for use in automobile drive shafts, though it is adapted for and capable of use with other types of machines.

The objects of the present invention are (1) to provide an efficient universal joint and (2) to so construct the universal joint and its bearing that it constitutes a lubricant reservoir in communication with bearing surfaces of the joint, whereby the joint carries its own lubricant supply, which will last for a period of time limited only by the size of the reservoir.

Referring now to the drawings, in which like reference characters designate the same parts, Figure 1 is a perspective view of a universal joint embodying our invention. Fig. 2 is a cross-sectional view on the line 2—2 of Fig. 1. Fig. 3 is a detached perspective view of the central head or cross of the joint.

Referring now to the drawings, 1 indicates a section of a shaft and 2 another section of the shaft. The shaft section 1 is provided with a U-shaped yoke 3, carrying a separable bushing clamp or housing 4 at each end, while the shaft section 2 is provided with a similar U-shaped yoke 5, which carries at each end a similar separable bushing clamp or housing 6. The yokes 3 and 5 are arranged at right angles to each other. Located between the ends of both of the U-shaped yokes 3 and 5, is a bearing head or cross 7, which is preferably cubical in shape, as shown. This head 7 is provided with four integral projecting bearing arms or pins 8, which extend therefrom at right angles to each other, as clearly illustrated in Fig. 3. The head 7 is made substantially hollow by forming therein a recess 9, which recess constitutes a lubricant reservoir. One end of this recess 9 is open, as indicated at 10, and a detachable plate 11 closes this open end. Each of the bearing arms or pins 8 is provided with a lubricant passage 12, extending entirely therethrough, the inner ends of the passages communicating with the lubricant reservoir 9 and the outer ends are open.

Substantially cup-shaped bearing bushings 13 are clamped by the separable clamps 4, the said bushings receive the bearing pins 8 so that the outer ends of the bearing pins are inclosed by the top portion of said bushings and the flange or rim portions 14 of the bushings project between the beforementioned separable clamps and the adjacent edges or sides of the head 7.

Access to the lubricant reservoir 9 is preferably afforded by means of a removable screw-plug 15 fitting within a screw-threaded opening 16 of the plate or cap 11.

The separable clamps 4 and 6 clamp the bushings 13 and when tight will prevent any rotation of the bushings in the said clamp, but to positively prevent any rotation of the bushings within the said separable clamps, pins 17 having their ends enter recesses or openings 18, respectively, are formed in the removable caps 19 of the clamps 4 and 6 and the head 7.

In operation the lubricant is placed within the reservoir 9 through the opening 16 and it is distributed to the bearing surfaces of the pins 8 and the bushings 13 through the oil passages or conduits or passages 12, there being sufficient space 20 left between the ends of the pins 8 and the heads of the bushings 13 to permit the lubricant to pass between them to the bearing surfaces of the pins and the bushings. Suitable annular rings or packings 21 are located between the head 7 and the rims 14 of the bushings to prevent the oil from leaking out, and thus confines the lubricant to the bearing surfaces and within the lubricant passages and the lubricant reservoir 9. This reservoir 9 will carry sufficient lubricant to last a considerable length of time and this, of course, is governed by the size of the reservoir. A reservoir of the size here shown, in practice will hold sufficient lubricant to last a couple of thousand miles.

The foregoing construction provides an efficient universal joint which carries its own lubricant reservoir and provides a convenient and efficient way for lubricating the bearing surfaces of the joint.

Having thus described our invention, what we claim and desire to secure by Letters Patent is:

A universal joint comprising a hollow head to constitute a lubricant reservoir, said hollow head having one side open, a plate closing the said opening of the head, said plate carrying a plug, said head provided with four bearing pins projecting therefrom at right angles to each other, annular packing rings carried by the head and surrounding the said bearing pins, cup-shaped bushings encompassing the bearing pins and engaging the annular packing rings, the head and pins having lubricant passages establishing communication between the reservoir, the annular packing rings, the cup-shaped bushings and the bearing surfaces of the pins and two shaft sections each having substantially U-shaped yokes which embrace the said pins at right angles to each other.

In testimony whereof we hereunto affix our signatures in the presence of two witnesses.

ALEXANDER WINTON.
HAROLD B. ANDERSON.

Witnesses:
W. J. WARD,
B. B. BROCKWAY.